(12) United States Patent
Reed et al.

(10) Patent No.: US 6,272,156 B1
(45) Date of Patent: Aug. 7, 2001

(54) APPARATUS FOR ULTRASHORT PULSE TRANSPORTATION AND DELIVERY

(75) Inventors: Murray K. Reed, Menlo Park; Briggs Atherton, Santa Clara, both of CA (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 09/229,456

(22) Filed: Jan. 12, 1999

Related U.S. Application Data
(60) Provisional application No. 60/072,795, filed on Jan. 28, 1998.

(51) Int. Cl.$^7$ ............................................. H01S 3/10
(52) U.S. Cl. ............................................. 372/25; 372/102
(58) Field of Search ...................... 372/25, 102, 6

(56) References Cited

U.S. PATENT DOCUMENTS

| | | | |
|---|---|---|---|
| 4,918,751 | | 4/1990 | Pessot et al. |
| 5,235,606 | * | 8/1993 | Mourou et al. ............... 372/25 |
| 5,260,954 | * | 11/1993 | Dane et al. ................... 372/25 |
| 5,434,875 | * | 7/1995 | Rieger et al. ................. 372/25 |
| 5,491,707 | * | 2/1996 | Rieger et al. ................. 372/25 |
| 5,862,287 | * | 1/1999 | Stock et al. .................. 372/25 |

OTHER PUBLICATIONS

Reed, M.K. Et Al., "Tunable ultraviolet generation using a femtosecond 250 kHz Ti:sapphire regenerative amplifier", IEEE Journal of Quantum Electronics, Sep. 1995, vol. 31, No. 9, pp. 1614–1618.

Lai, M. Et Al., "Single–grating laser pulse stretcher and compressor", Applied Optics, Oct. 20, 1994, vol. 33, No. 30, pp. 6985–6987.

Atherton, B.W. Et Al., "Pre–chirped fiber transport of 800 nm fs pulses", Commercial Applications of Ultrafast Lasers, Jan. 29–30, 1998, vol. 3269, pp. 25–25.

Copy of the Search Report from a foreign patent office, issued in a counterpart application.

* cited by examiner

*Primary Examiner*—Leon Scott, Jr.
(74) *Attorney, Agent, or Firm*—Stallman & Pollock LLP

(57) ABSTRACT

Apparatus for transporting a laser-pulse from a pulsed-laser to a receiver includes a pulse-expander, an optical-fiber, and a pulse-compressor. The pulse-expander is arranged to receive and temporally-expand the laser-pulse from the pulsed laser. The optical-fiber at its proximal end to receive the laser-pulse from the pulse-expander and transport the laser-pulse to the pulse-compressor. The pulse-compressor is arranged to receive the laser-pulse from the optical-fiber, temporally-compress the laser-pulse, and deliver the laser-pulse to the receiver. The pulse-compressor includes a block of optically-dispersive material, the temporal-compression being effected by an optical arrangement that causes the laser-pulse to follow a zigzag path through the block of optically-dispersive material. The pulse-expander may be arranged to provide variable third-order dispersion of a laser-pulse being expanded. The pulse compressor may be included in a handpiece attached to the distal end of the optical-fiber.

31 Claims, 3 Drawing Sheets

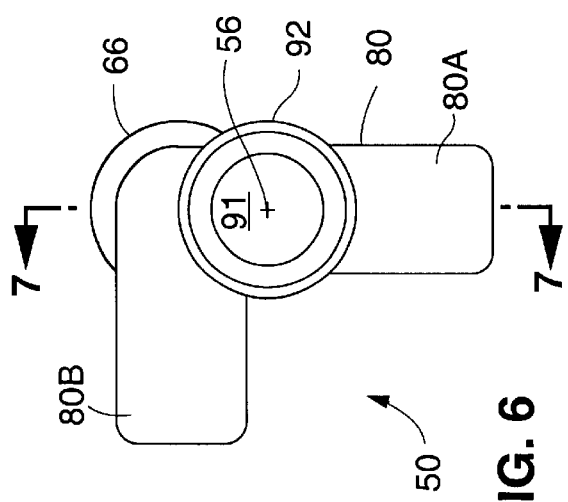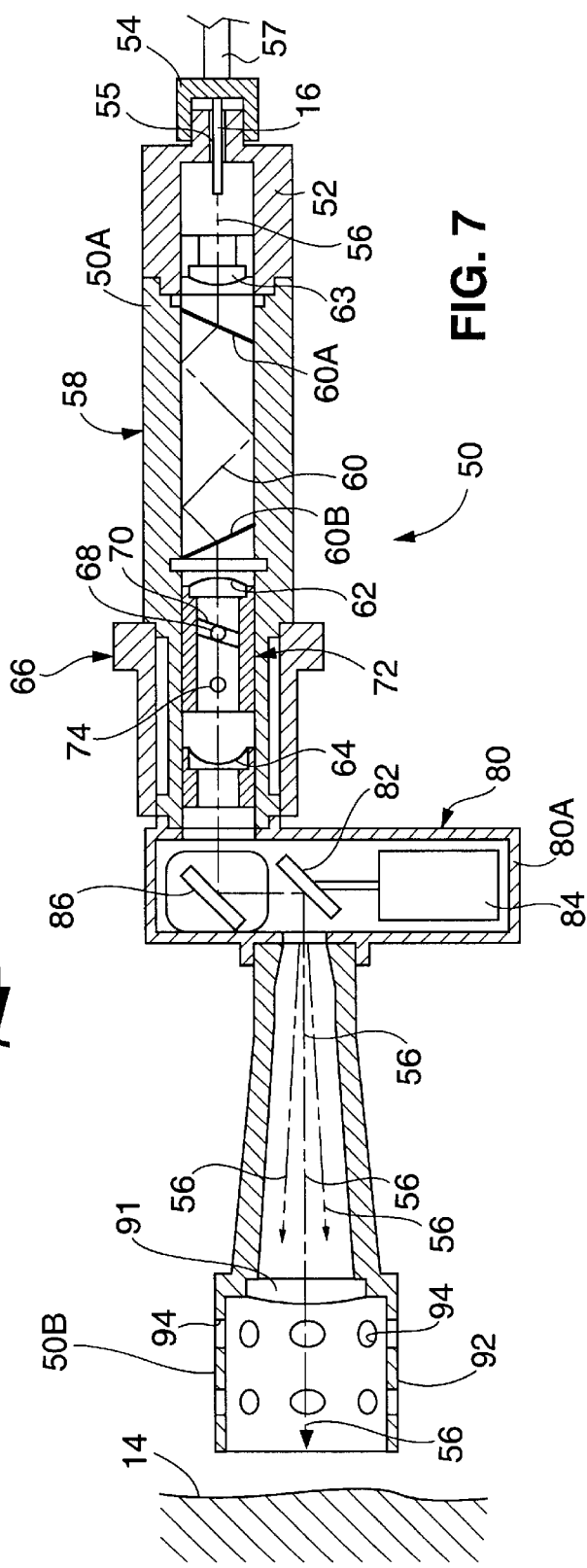

APPARATUS FOR ULTRASHORT PULSE TRANSPORTATION AND DELIVERY

This application claims the benefit of U.S. Provisional Application No. 60/072,795, filed Jan. 28, 1998, and entitled Ultrafast Laser Pulse Delivery System With An Optical Fiber.

TECHNICAL FIELD OF THE INVENTION

The present invention relates to ultrafast lasers which provide ultrashort pulses and wide bandwidths, for example, having a width of about 100 femtoseconds (fs) or less, and a bandwidth of about 1.0 nanometer (nm) or greater.

DISCUSSION OF BACKGROUND ART

Ultrafast laser oscillators, such as a Kerr-lens mode-locked, titanium-doped sapphire (Ti:sapphire) laser, can generate a series of short optical pulses. The temporal pulse-length of the output is determined by the laser system dynamics and can vary from less than 10 femtoseconds to more than 1 picosecond. The temporal pulse-length is inversely proportional to the pulse-wavelength and bandwidth. Shorter pulses have wider bandwidths. For example, a 100 fs pulse having a center wavelength at 1000 nm requires at least 11 nm of bandwidth. The temporal-separation and repetition-rate of the pulses is determined by the round-trip time that light takes to oscillate in the laser cavity. A typical ultrafast laser system can operate at a pulse-separation of 10 nanoseconds (ns), i.e., a pulse repetition-rate of 100 Megahertz (MHz). The average power of the laser can vary, from a few milliwatts (mw) to several Watts (W), resulting in pulses having energies from tens of nanojoules (nJ) per pulse, and peak intensities greater than 100 Kilowatts (KW). Ultrafast amplifier systems can increase the energy per pulse to over 1 Joule (J) and average intensities over 1.0 Terawatts (TW). Optical-fibers are used in optical delivery systems for ultrashort pulses because they are versatile and provide good spatial beam quality. For light having a wavelength of about 800 nm, single-mode fibers having very small core diameters, for example, about 5 micrometers ($\mu$m) are available. Larger diameter optical-fibers can carry beams with higher order spatial distortions. Single-mode polarization-preserving optical-fibers with built-in birefringence are also available. Optical-fibers are often used to aid delivery of a laser system's optical output to small hand-held devices (handpieces) for laser-surgery or laser material-processing.

Ultrafast (ultrashort) laser-pulses experience linear optical dispersion effects when passing through an optical material, such as the quartz-glass (fused silica) used to form the core of an optical-fiber. Second-order and third-order linear dispersion effects delay the short-wavelength end of the light spectrum of the pulse relative to the long-wavelength end, thus temporally expanding the laser-pulse. The amount of linear dispersion on a given laser-pulse depends upon the bandwidth of the laser-pulse, the dispersion properties of the material, and the length of material traversed by the laser-pulse.

Ultrafast laser-pulses also experience nonlinear optical distortion effects when passing through materials at high power-densities. The nonlinear distortion depends upon the intensity of the laser-pulse, the nonlinear coefficient of the material, and the length of material traversed by the laser-pulse. Nonlinear optical distortion places a maximum limit on the power that can be delivered by an optical-fiber without inducing significant nonlinear distortion of the ultrafast pulse.

Both linear and nonlinear distortions are pronounced when using single-mode optical-fibers because of the very long optical path lengths (typically several meters); high power-densities due to the very small beam size (core diameter of the fiber, typically about 5 $\mu$m) in the fiber; and the short temporal pulse width. For these reasons, using optical-fibers to deliver ultrafast laser system output has not been widespread in applications that need to preserve the temporal character of the laser-pulses.

One proposed solution to power handling problems of above-described problems is disclosed in U.S. Pat. No. 4,918,751 granted to Pessot et al. Here, a laser-pulse is temporally-expanded (stretched) by a pair of diffraction-gratings before being injected into an optical-fiber. The laser-pulse is temporally-expanded to an extent that recompression effects of the optical-fiber are insufficient to raise the pulse intensity in the optical-fiber to a point at which nonlinear effects become significant. After exiting the optical-fiber, the laser-pulse is further compressed, using a second diffraction-grating-pair, to a desired pulse-length.

There are several drawbacks to the solution proposed by Pessot et al. By way of example, optical-fibers induce a negative second-order linear dispersion and a positive third-order linear dispersion on light passing therethrough. Diffraction-gratings of the type used to broaden the pulse before it enters the fiber introduce a negative second-order dispersion but a positive third-order dispersion. Because of this, while the diffraction-gratings are counteracting the second-order linear dispersion of the fiber, they compound the third-order linear dispersion.

Further by way of example, the pulse communication system of Pessot et al. is conceived for fixed transmitter and receiver arrangements for optical communication systems. In such systems, there are no particular constraints on space and complexity of the pulse-compression and pulse-expansion scheme. Uses for ultrafast laser-pulses, however, now are rapidly expanding into areas such as scientific and industrial instruments, and laser medical and dental applications wherein a compact or portable device is generally preferable to a bulky device.

In medical and dental applications in particular, laser-light for therapeutic or surgical uses is often delivered to a treatment site by an optical-fiber which terminates, at the delivery-end thereof, in a handpiece used by a doctor performing the treatment. Complexity aside, the space required for a diffraction-grating pulse-compressor would make it impractical for incorporation in such a handpiece.

There is a need for a delivery system that can deliver ultrafast laserpulses using an optical-fiber in a manner that allows the laser-pulses to traverse the delivery system without causing significant nonlinear distortion of the laser-pulses and fully compensates for both second and third-order linear dispersion effects in the optical-fiber. The system should preferably not require a complex, diffraction-grating pulse-compressor at the delivery end of the optical-fiber.

SUMMARY OF THE INVENTION

The present invention is directed to apparatus for transporting a laser-pulse from a pulsed-laser to a receiver. In one aspect apparatus in accordance with the present invention comprises a pulse-expander, an optical-fiber, and a pulse-compressor. The pulse-expander is arranged to receive and temporally expand the laser-pulse from the pulsed laser. The optical-fiber is arranged to receive the laser-pulse from the pulse-expander and transport the pulse to the pulse-compressor. The pulse becomes temporally-compressed as a result of the transporting through the optical-fiber. The pulse-compressor is arranged to receive the laser-pulse from the distal end of the optical-fiber, further temporally-compress the laser-pulse, and deliver the laser-pulse to the receiver. The pulse-compressor includes a block of optically-dispersive material, the further temporal-compression being effected by an optical arrangement that causes the laser-pulse travel through the block of optically-dispersive material.

In another aspect of the present invention, the pulse-expander includes a diffraction-grating and a refractive optical-element. The pulse-expander is arranged such that a received laser-pulse is incident on the diffraction-grating and traverses the refractive optical element before being delivered to the optical-fiber. The optical element is moveable with respect to the diffraction-grating in a manner which varies third-order dispersion of the laser-pulse by the pulse-expander.

In yet another aspect of the present invention, the pulse-compressor is located in a handpiece attached to the distal end of the optical-fiber. The handpiece allows an operator to deliver the laser-pulse to a desired target location. The handpiece may include optical-components for focussing, collimating or varying a spatial dimension of the laser-pulse.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the invention.

FIG. 6 is a front view of a scanning handpiece, attachable to the output end of the transport fiber of FIG. 1 and including a temporal pulse-compressor in accordance with the example of FIG. 5.

FIG. 7 is cross-section view of the scanning handpiece of FIG. 6, seen generally in the direction 7—7 of FIG. 6.

DETAILED DESCRIPTION OF THE INVENTION

Figure 1:
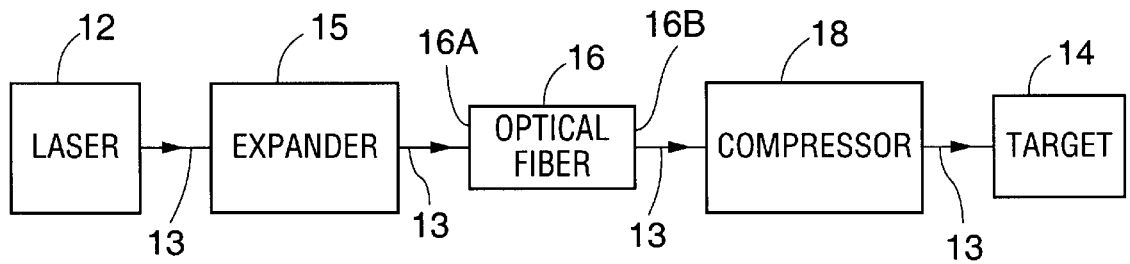
FIG. 1 is a block diagram schematically illustrating one preferred embodiment of an ultrafast pulse-delivery system in accordance with the present invention including a temporal pulse-expander, a transport optical-fiber and a temporal pulse compressor.

Turning now to the drawings, wherein like components are designated by like reference numerals, FIG. 1 shows a general layout 10 of one preferred optical-fiber, ultrafast laser-pulse delivery system in accordance with the present invention. Delivery system 10 delivers ultrafast (ultrashort) laser-pulses from a laser system 12 to an intended target 14. Target 14, may be simply a surface, or may be all or some part of an optical system, optical instrument or communications receiving system. Delivery system 10 includes a temporal pulse-expander (pulse-stretcher) 15, an optical-fiber 16 having entrance (proximal) and exit (distal) ends 16A and 16B respectively, and a temporal pulse-compressor 18. Fiber 16 is illustrated, here, in block form for convenience of description, and may be from as little as 0.02 meters (m) long to several Kilometers (Km) long.

A laser system may be any ultrafast laser system that produces an optical output beam 13 comprising ultrashort laser-pulses, for example, less than several picoseconds in duration. In the following description, beam 13 is alternatively referred to as a laser-pulse 13 depending on the context of the description.

Figure 2:
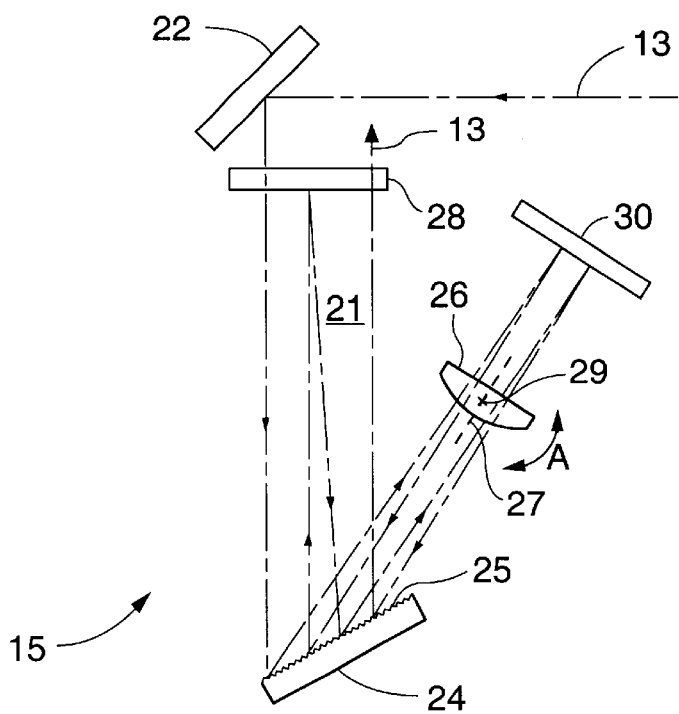
FIG. 2 is a general view schematically illustrating one preferred example of a temporal pulse-expander in accordance with the present invention, including a diffraction-grating and a rotatable lens for controlling third-order dispersion of laser-pulses.

Referring now to FIG. 2, one preferred example of pulse-expander 15 includes an input-mirror 22, a diffraction-grating 24, a lens 26, having an optical axis 27, and two highly-reflecting mirrors 28 and 30. Rulings 25 of the diffraction-grating are assumed to be in a direction perpendicular to the plane of FIG. 2, such that the plane of dispersion of the grating is in, or parallel to, the plane of FIG. 2.

Beam 13 from the laser 12 reflects off of mirror 22, passes past mirror 28, reflects off of diffraction-grating 24, passes through lens 26, reflects off mirror 30 back to lens 26, passes through lens 26 again, and reflects off diffraction-grating 24 to mirror 28 which redirects the beam back to diffraction-grating 24. Beam 13 thus traverses a cavity 21 defined by mirrors 28 and 30. The components of pulse-expander 15 are aligned so after beam 13 completes the traverse of cavity 21 as described above, the beam misses mirrors 28 and 22 and is directed out of pulse-expander 15.

In pulse expander 15, diffraction-grating 24 provides negative second-order linear dispersion and negative third-order linear dispersion. Lens 26, however, provides positive third-order linear dispersion. This amount of positive third-order linear dispersion can be adjusted by rotating lens 26 about a rotation-axis 29 perpendicular to optical axial-axis 27. Rotation axis 29 is transverse, preferably essentially-perpendicular to the plane of dispersion of diffraction-grating 24, as indicated by arrow A. Rotation of lens 26 as indicated changes the amount of glass the beam traverses, i.e., changes the path length of a laser-pulse through lens 26, thereby varying the magnitude of positive third order dispersion. Second-order dispersion contribution of lens 26 is essentially negligible compared with that of the multiple diffractions of grating 24.

Those skilled in the art will recognize that while multiple reflections in FIG. 2 apparently occur in the same plane, this is merely for convenience of illustration. A slight (insignificant compared with incidence-angles of the general arrangement) inclination of components with respect to each other is desirable, in practice, to create the depicted optical path. The term "essentially-perpendicular", as used above with respect to rotation of lens 26, recognizes this desirability.

Pulse-expander 15, as a whole, imparts a negative second-order linear dispersion and positive third-order linear dispersion to a beam (laser-pulse) passing therethrough. Pulse-expander 15 is configured so that the amount of negative second-order linear dispersion generated thereby is made to offset positive second-order linear dispersion generated by optical-fiber 16 and pulse-compressor 18. Likewise, the amount of positive third-order linear dispersion generated by pulse-expander 15 is made to help compensate the negative third-order linear dispersion generated by optical-fiber 16 and pulse compressor 18.

From this description it will be evident to those skilled in the art that the pulse-expander arrangement of FIG. 2 is but one such arrangement which will achieve temporal pulse-expansion (pulse-stretching) and independent adjustment of second and third-order dispersion of a laser-pulse being expanded.

By way of example, a refractive optical-component other than lens 26 may be made moveable (i.e. by rotation or translation) for varying third-order dispersion. Such a refractive optical-component need not have any optical-power and may be anamorphic. Lens 26 or other such refractive optical-component may include one or more refractive optical-elements.

Further by way of example, a pulse-expander may be arranged such that a laser-pulse being expanded may be diffracted only once by a diffraction-grating, and traverse lens 26 (or some other movable refractive optical-component) only once, or may be subject to any plurality of grating-diffractions or traversals of a refractive optical-component. The number of diffractions and traversals need not be the same. Multiple grating-diffractions may be accomplished using one or a plurality of diffraction-gratings. Multiple refractive optical-component traversals may be accomplished using one or a plurality of refractive optical-components.

Referring again to FIG. 1, after leaving temporal pulse-expander 15, beam 13 traverses through optical-fiber 16. Principles of the present invention are applicable in particular in applications wherein optical-fiber 16 is a single-mode, polarization-preserving, optical-fiber. Such an optical-fiber generates both positive second-order linear dispersion and negative third-order linear dispersion. The magnitude of negative positive second-order dispersion of temporal pulse-expander 15 is selected to be greater than the magnitude of the positive second-order dispersion of optical-fiber 16. Accordingly, while optical-fiber 16 acts to temporally-compress a laser-pulse traversing therethrough, it does not fully temporally-compress the laser-pulse back to the original length of the laser-pulse 13 as it entered pulse-expander 15. After beam 13 exits output end 16B of optical-fiber 16, beam 13 enters pulse-compressor 18.

Figure 3:
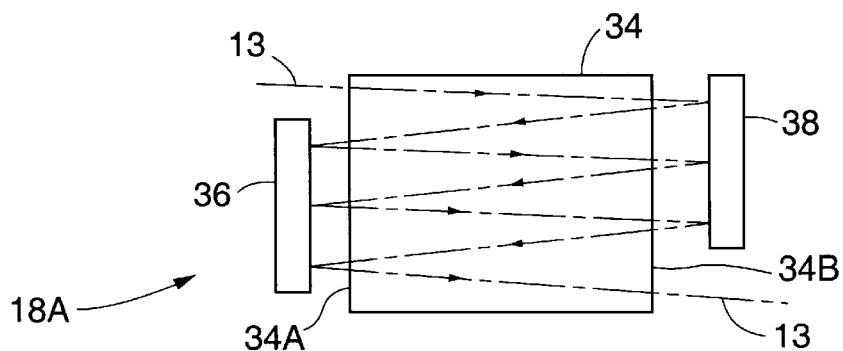
FIG. 3 is a general view schematically illustrating a first preferred example of a temporal pulse-compressor in accordance with the present invention including a block of optically-dispersive material and mirrors for directing a laser-pulse in a zigzag path through the block of material.

Referring now to FIG. 3, one preferred arrangement 18A of pulse-compressor 18 is illustrated. Pulse-compressor 18A includes a block of material 34 having optical-dispersion, preferably, relatively-high optical dispersion, in the wavelength range of operation of laser 12. For a Ti:sapphire laser such a wavelength range is between about 680.0 nm and 1060 nm.

Relatively-high optical dispersion here implies higher than the dispersion provided by the material of the optical fiber. For example a 3.0 m long optical fiber may provide about $1\times10^5$ $fs^2$ positive second-order dispersion and about $1\times10^5$ $fs^3$ negative third-order linear dispersion. It is preferable that compensating dispersion be provided by block 34 in a path length much shorter than 3 m. Accordingly, it is preferable that the material of block 34 provide a second order-dispersion greater than about 350 femtoseconds squared per centimeter (350 $fs^2$/cm).

Figure 4:
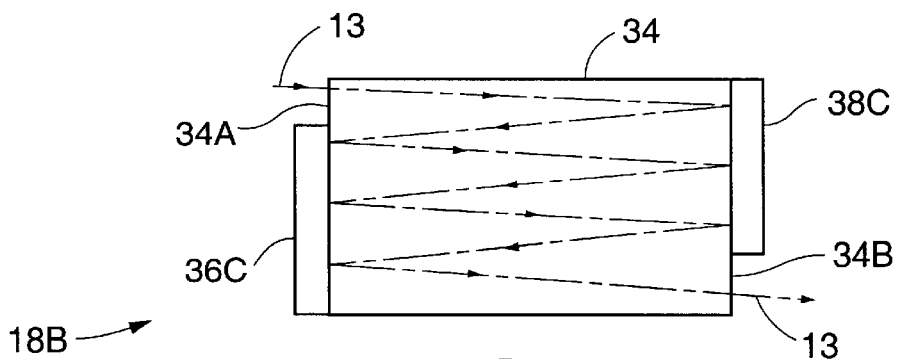
FIG. 4 is a general view schematically illustrating a second preferred example of a temporal pulse-compressor in accordance with the present invention including a block of transparent material having opposing reflective-coated surfaces directing a pulse in a zigzag path through the block of optically-dispersive material.
Figure 4A:
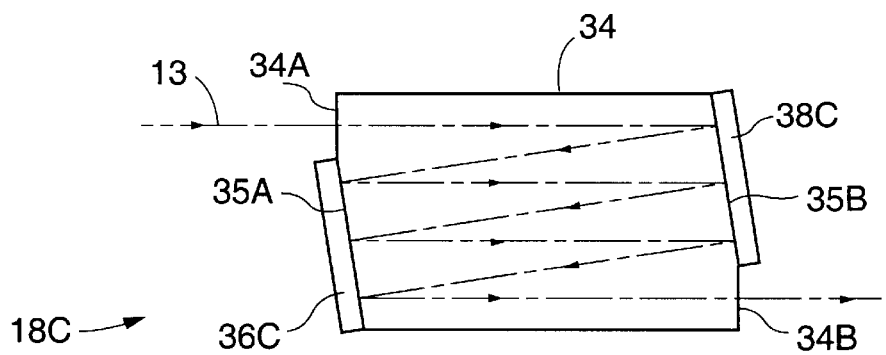
FIG. 4A is a general view schematically illustrating an alternate arrangement of a temporal pulse-compressor of the type depicted in FIG. 4.

For providing relatively-high optical dispersion in this wavelength region, suitable materials are, for example, tellurium oxide ($TeO_2$), zinc sulfide (ZnS) or zinc selenide (ZnSe). Pulse compressor 18A includes two highly reflecting mirrors 36 and 38. To reduce the size of the block of optically-material 34, mirrors 36 and 38 are arranged to cause the beam or pulse 13 to pass many times through the dispersion material 34 in a zigzag manner. FIG. 4 depicts a similar embodiment 18B, wherein mirrors 36 and 38 of embodiment 18A, are replaced by reflective coatings 36C and 38C partially covering entrance and exit faces 34A and 34B of block 34. FIG. 4A depicts an alternate arrangement 18C of the pulse compressor of FIG. 4 including entrance and exit faces 34A and 34B respectively which are arranged parallel to each other and perpendicular to beam 13 as it enters and exits block 34. Corresponding reflective faces 35A and 35B including reflective coatings 36C and 38C are arranged at an angle to entrance and exit faces 34A and 34B respectively. Reflective faces 35B and 35A, arranged parallel to each other, cause beam 13, after entering entrance face 34A, to traverse block 34 in a zigzag path before leaving block 34 via exit face 34B thereof.

The relatively-high optical-dispersion material of block 34, generates a positive second-order linear dispersion and a negative third-order linear dispersion to the beam (pulse) 13. For a block of a given material, the dispersion can be adjusted simply by controlling the number of times a pulse traverses the block, and the length of the block. Clearly, the higher the dispersion of the material of block 34 the more dispersion will provided for a given number of passes of a given length. The dispersion can be selected such that when the laser-pulse exits block 34 after its last traverse therethrough, the pulse-length is fully compressed back to or near the pulse-length of the laser-pulse as it entered temporal pulse-expander 15.

Beam or laser-pulse 13 exits optical-fiber 16 as a diverging beam. The beam diverges according to the numerical aperture of the fiber. The beam is allowed to continue to diverge (expand), and is then collimated by a lens (Not shown) before entering pulse-compressor 18 at a diameter which is much larger in pulse-compressor 18 than is possible inside optical-fiber 16. This results in a lower power-density of the laser-pulse in pulse compressor 18. Beam expansion is preferably sufficient that even after a pulse is fully recompressed, power density in the pulse is below a level which can cause optical component damage. If necessary, one or more optical-components (not shown) may be provided between fiber 16 and pulse-compressor 18 to cause increased divergence of a beam or laser-pulse before it is collimated prior to traversing block 34.

Figure 5:
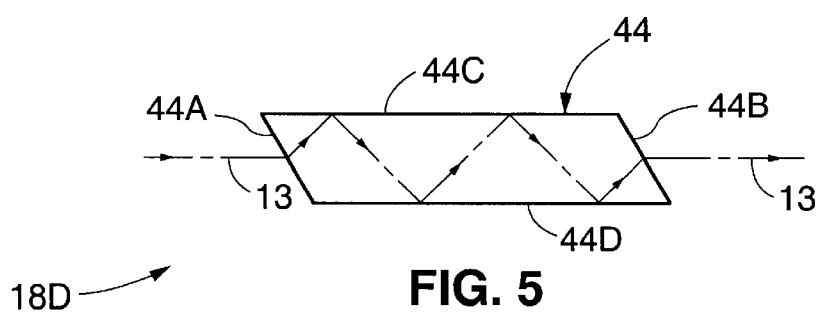
FIG. 5 is a general view schematically illustrating a third preferred example of a temporal pulse-compressor in accordance with the present invention including a block of optically-dispersive material arranged to conduct a pulse in a zigzag path therethrough by multiple total-internal-reflections.

Referring now to FIG. 5, another preferred example 18D of pulse-compressor 18 is illustrated. Here, a block of optically-dispersive material 44 has entrance and exit faces 44A and 44B thereof arranged at Brewster's angle to beam 13 to minimize back-reflections. Angled entrance-face 44A causes refraction of beam 13 such that it traverses through block 44 in a zigzag pattern resulting from multiple total internal reflections (TIR) from lateral faces 44C and 44D thereof. By utilizing TIR, the need for above-discussed high-reflectors 26/28 of pulse-compressor 18A are eliminated, thus simplifying the design and minimizing cost of pulse-compressor 18. Further, block 44 can be arranged such that a beam enters and leaves in the same direction, without lateral displacement.

It should be noted here that while pulse-compressor arrangements 18A–D in most applications for a convenient size of blocks 34 or 44 will require beam 13 to follow a zigzag (extended) path therethrough, compression by only a single pass through a block of appropriate dimensions may be effected without departing from the spirit and scope of the present invention. Similarly apparatus in accordance with the present invention may employ more than one block of optically dispersive material to achieve a desired pulse compression.

In one example of a delivery system 10 in accordance with the present invention, an ultrafast laser system operates at 80 MHz and produces 100 fs laser-pulses at 800 nm. The laser-pulses have a 10 nm bandwidth. As each 100 fs laser-pulse enters pulse-expander 15, it is expanded to a pulse-length of 6000 fs, and experiences a second-order linear dispersion of $-2 \times 10^5$ $fs^2$. The laser-pulse then traverses optical-fiber 16, which is a single-mode, polarization-preserving, optical-fiber that is 3 meters long and has a core approximately 5 microns in diameter. Optical-fiber 16 induces a second-order linear dispersion of $1 \times 10^5$ $fs^2$, resulting in a pulse-length of 3000 fs as the laser-pulse exits optical-fiber 16. A block (block 34) of $TeO_2$ material about 200 millimeters (mm) thick (long), which the laser-pulse passes through seven times, induces another $1 \times 10^5$ $fs^2$ second-order linear dispersion resulting in a 100 fs-long laser-pulse exiting pulse-compressor 18. Lens 26 of pulse-expander 15 is set to optimally compensate the third-order linear dispersion effects of optical-fiber 16 and pulse-compressor 18. The peak intensity in optical-fiber 16 should not exceed 1.6 Gigawatts per square centimeter ($GW/cm^2$) to avoid nonlinear distortions, so the average power in optical-fiber 16 can reach as high as about 75.0 mW without producing significant nonlinear distortion. In contrast, if just a diffraction grating and optical-fiber were used to offset each other without using the block of optically-dispersive material 34, the average power in optical-fiber 16 could not exceed about 5 mW without inducing significant nonlinear distortions. Therefore the present invention increases, by well over an order of magnitude, the average power that can be used with an optical-fiber while still preserving the temporal qualities of the femtosecond pulses. This is especially important when using small-core, single-mode, polarization-preserving, optical-fibers.

As noted above, pulse compression can be achieved with prism or grating arrangements, such arrangements however are space-consuming. It is believed that the such an arrangement could not be accommodated in a volume much less than about 600 cubic centimeters (cc). A pulse-compressor arrangement such as the arrangement of pulse-compressor 18A or 18B, however, may be readily accommodated in a volume of about 10.0 cc and even as little as 5.0 cc. Because of this, such a pulse-compressor can be conveniently incorporated in a handpiece that facilitates manipulation and direction of the optical output of optical-fiber 16 to an intended target. A description of such a handpiece is set forth below.

Referring to FIGS. 6 and 7 a scanning handpiece 50 has an adaptor 52 at proximal end 50A thereof. The adaptor is arranged to accept an optical-fiber connector 54 and has an aperture 55 therein to accept optical-fiber 16. Beyond optical-fiber connector 54, optical-fiber 16 is protected by flexible sheathing 57. The path of light (a laser-pulse) from optical-fiber 16 through handpiece 50 is depicted by broken line 56.

An optics-housing 58 includes a pulse-compressor 60 which is similar in function to above-described pulse-compressor 18B of FIG. 5. Light (laser-pulse) 56 spatially expands on leaving optical-fiber 16, is collimated by a lens 63 at a diameter of about 2.0 to 3.0 mm, then traverses pulse-compressor 60 in a zigzag path, entering via entrance-face 60A thereof and exiting via exit-face 60B thereof, being temporally-compressed as it traverses. Lenses 62, and 64 are beam-conditioning lenses for focussing and controlling beam size of light 56. Focus adjustment, here, is provided in that lens 62 is longitudinally moveable with respect to lens 64. Movement is effected by a rotatable sleeve 66. Sleeve 66 includes a pin 70 which engages a helical slot 70 in a lens holder 72 in which lenses 62 and 63 are located. A pin 74 engages a groove (not shown) in housing 58 to prevent rotation of lens holder 72.

Optics-housing 58 is attached to a scanner unit 80. Scanner unit 80 includes arms 80A and 80B. In arm 80A is located a scanning (galvanometer) mirror 82 which is driven by a galvanometer drive 84. A similar galvanometer drive (not shown) in arm 80B of scanner unit 80 drives a scanning mirror 86 in a direction orthogonal to the drive direction of mirror 84. Mirrors 82 and 86 operate together to direct light pulses 56, down delivery tube 90 via a focussing lens 91, to deposit a predetermined pattern thereof on a surface being treated. Control of scanning mirrors 82 and 86 is provided by a processor (not shown) in electronic communication with the galvanometer drives. Delivery tube 90 terminates in a hood 92, including perforations 94, at the distal end 50B of scanner 50. A cowl and exhaust-conduit (not shown) surround hood 92 to draw any smoke resulting from the incident laser-pulses on surface 14, via perforations 94, out of the path of light 56.

Scanning handpiece 50 is but one handpiece arrangement in which a pulse-compressor in accordance with the present invention may be incorporated. Clearly such a compressor may be incorporated in less sophisticated handpieces. Such a less-sophisticated handpiece, for example, may be a non-scanning handpiece not incorporating a scanning unit, but including an optics-housing similar to optics-housing 58 for housing the pulse-compressor. The optics-housing may optionally include fixed or adjustable beam conditioning optics.

The present invention is described above in terms of a preferred and other embodiments. The invention is not limited, however, to the embodiments described and depicted. Rather the invention is defined by the claims appended hereto.

What is claimed is:

1. Apparatus for transporting a laser-pulse from a pulsed-laser to a receiver, comprising:

a pulse-expander, an optical-fiber, and a pulse-compressor; said pulse-expander arranged to receive and temporally expand the laser-pulse from the pulsed laser;

said optical-fiber positioned to receive the laser-pulse from said pulse-expander and transport the pulse to said pulse-compressor, said pulse becoming temporally-compressed as a result of said transporting;

said pulse-compressor including a block of optically-dispersive material through which the laser-pulse from the optical-fiber passes, said block further temporally-compresses the laser-pulse and delivers the laser-pulse to the receiver, and wherein said pulse-compressor includes an optical arrangement that causes the laser-pulse to follow a zigzag path through said block of optically-dispersive material such that the net dispersion for a given length of the optically-dispersive material is increased.

2. The apparatus of claim 1, wherein said pulse expander, said optical-fiber and said block are selected to minimize the difference between the amount of temporal expansion created by the pulse-expander and the combined amount of temporal compression created by the optical-fiber and the pulse-compressor.

3. The apparatus of claim 1, wherein said pulse-expander causes second and third-order dispersion of said laser pulse and said third-order dispersion is variable.

4. The apparatus of claim 3, wherein said pulse-expander includes a diffraction-grating and a refractive optical-component and is arranged such that the received laser-pulse is diffracted by the diffraction-grating and traverses said refractive optical-component before being delivered to said optical-fiber, said refractive optical-component being moveable with respect to said diffraction-grating for varying said third-order dispersion.

5. The apparatus of claim 4, wherein said movement of said refractive optical-component with respect to said diffraction-grating causes a change in path length of the laser-pulse through said refractive optical-component.

6. The apparatus of claim 3, wherein said pulse-expander includes a diffraction-grating having a diffraction plane and a refractive optical-component having an optical axis and is arranged such that the received laser-pulse is diffracted at least once by the diffraction-grating and traverses said refractive optical-component at least once before being delivered to said optical-fiber, said refractive optical-component being rotatable about a rotation-axis transverse to said optical-axis for varying said third-order dispersion.

7. The apparatus of claim 6, wherein said received laser-pulse is diffracted a plurality of times by said diffraction-grating and traverses said refractive optical-component a plurality of times before being delivered to said optical-fiber.

8. The apparatus of claim 7, wherein said received laser-pulse is diffracted four times and traverses said refractive optical-component four times.

9. The apparatus of claim 1, wherein said pulse-compressor includes first and second mirrors facing respectively first and second opposite faces of said block of optically-dispersive material, said zigzag path of the laser-pulse through said block of optically-dispersive material being caused by multiple reflections of the laser-pulse between said first and second mirrors.

10. The apparatus of claim 1, wherein said block of optically-dispersive material of said pulse-compressor has first and second opposite faces each thereof having a reflective portion, said zigzag path of the laser-pulse through said block of optically-dispersive material being caused by multiple reflections of the laser-pulse between said reflective portions of said first and second opposite faces.

11. The apparatus of claim 1, wherein said block of optically-dispersive material of said pulse-compressor has first and second opposite end-faces, and first and second opposite lateral-faces, said end-faces and lateral-faces arranged such that said zigzag path of the laser-pulse through said block of optically-dispersive material is caused by refraction of the laser pulse at said first end-face followed by multiple total-internal-reflections between said first and second lateral-faces.

12. The apparatus of claim 11 wherein said laser pulse exits said block of optically-dispersive material via said second end-face.

13. The apparatus of claim 1, wherein said pulse-compressor is located in a handpiece connected to said optical-fiber.

14. Apparatus for transporting a laser-pulse from a pulsed-laser to a receiver, comprising:

a pulse-expander, an optical-fiber, and a pulse-compressor;

said pulse-expander arranged to receive and temporally expand the laser-pulse from the pulsed laser, said pulse-expander including an optical element that is movable to adjust the amount of said temporal expansion by said pulse-expander;

said optical-fiber positioned to receive the laser-pulse from said pulse-expander and transport the pulse to said pulse-compressor, said pulse becoming temporally-compressed as a result of said transporting; and said pulse-compressor arranged to receive the laser-pulse from said optical fiber, and further temporally-compresses the laser-pulse and delivers the laser-pulse to the receiver.

15. The apparatus of claim 14, wherein said pulse expander, said optical-fiber and said pulse compressor are selected to minimize the difference between the amount of temporal expansion created by the pulse-expander and the combined amount of temporal compression created by the optical-fiber and the pulse-compressor.

16. The apparatus of claim 15, wherein said movable optical element is a refractive optical-component.

17. The apparatus of claim 16, wherein said refractive optical-component is rotated or translated with respect to said diffraction-grating for varying third-order dispersion.

18. The apparatus of claim 17, wherein said pulse-expander causes second and third-order dispersion of said laser pulse and said third-order dispersion is variable.

19. The apparatus of claim 17, wherein said movement of said refractive optical-component with respect to said diffraction-grating causes a change in path length of the laser-pulse through said refractive optical-component.

20. The apparatus of claim 15, wherein said pulse-expander further includes a diffraction-grating, and wherein the grating and optical component are arranged such that the received laser-pulse is diffracted by the diffraction-grating and traverses said refractive optical-component before being delivered to said optical-fiber.

21. The apparatus of claim 15, wherein the pulse-compressor includes:

a block of optically-dispersive material through which the laser-pulse from the optical-fiber passes; and an optical arrangement that causes the laser-pulse to follow a zigzag path through said block of optically-dispersive material.

22. The apparatus of claim 21, wherein said pulse-compressor includes first and second mirrors facing respectively first and second opposite faces of said block of optically-dispersive material, said zigzag path of the laser-pulse through said block of optically-dispersive material being caused by multiple reflections of the laser-pulse between said first and second mirrors.

23. The apparatus of claim 21, wherein said block of optically-dispersive material of said pulse-compressor has first and second opposite faces each thereof having a reflective portion, said zigzag path of the laser-pulse through said block of optically-dispersive material being caused by multiple reflections of the laser-pulse between said reflective portions of said first and second opposite faces.

24. The apparatus of claim 21, wherein said block of optically-dispersive material of said pulse-compressor has first and second opposite end-faces, and first and second opposite lateral-faces, said end-faces and lateral-faces arranged such that said zigzag path of the laser-pulse through said block of optically-dispersive material is caused by refraction of the laser pulse at said first end-face followed by multiple total-internal-reflections between said first and second lateral-faces.

25. The apparatus of claim 24 wherein said laser pulse exits said block of optically-dispersive material via said second end-face.

26. The apparatus of claim 15, wherein said pulse-expander includes a diffraction-grating having a diffraction plane and said movable optical element is a refractive optical-component having an optical axis, and wherein the grating and the optical component are arranged such that the received laser-pulse is diffracted at least once by the diffraction-grating and traverses said refractive optical-component at least once before being delivered to said optical-fiber, said refractive optical-component being rotatable about a rotation-axis transverse to said optical-axis for varying said third-order dispersion.

27. The apparatus of claim 26, wherein said received laser-pulse is diffracted a plurality of times by said diffraction-grating and traverses said refractive optical-component a plurality of times before being delivered to said optical-fiber.

28. The apparatus of claim 27, wherein said received laser-pulse is diffracted four times and traverses said refractive optical-component four times.

29. The apparatus of claim 15 wherein said pulse-compressor is located in a handpiece connected to said optical-fiber.

30. A handpiece for directing ultrafast laser-pulses transported by an optical fiber toward a target, the optical-fiber being arranged such that the transported laser pulses exit the optical-fiber at an exit end thereof, the handpiece comprising:

a connection to the exit end of the optical-fiber; and a block of optically-dispersive material and arranged such that a pulse exiting the optical fiber traverses said block of optically-dispersive material before being directed toward the target, said traversal of said block of optically dispersive material causing temporal compression of the pulse.

31. The handpiece of claim 30, further comprising:

an optical arrangement that causes the laser-pulse to follow a zigzag path through said block of optically-dispersive material.

* * * * *